United States Patent
Lu et al.

(10) Patent No.: US 12,517,731 B2
(45) Date of Patent: Jan. 6, 2026

(54) TEXTURE PREFETCHING SCHEME FOR GRAPHICS PROCESSING SYSTEM

(71) Applicant: ASPEED Technology Inc., Hsinchu (TW)

(72) Inventors: Chung-Yen Lu, Hsinchu (TW); Kuo-Wei Yeh, Hsinchu (TW)

(73) Assignee: ASPEED TECHNOLOGY INC., Hsinchu (TW)

( * ) Notice: Subject to any disclaimer, the term of this patent is extended or adjusted under 35 U.S.C. 154(b) by 134 days.

(21) Appl. No.: 18/630,734

(22) Filed: Apr. 9, 2024

(65) Prior Publication Data

US 2025/0315261 A1    Oct. 9, 2025

(51) Int. Cl.
G06F 9/38    (2018.01)
G06T 1/60    (2006.01)

(52) U.S. Cl.
CPC .............. *G06F 9/3802* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 5,990,902 A | 11/1999 | Park | |
| 6,426,753 B1 | 7/2002 | Migdal | |
| 7,948,498 B1 | 5/2011 | Minkin | |
| 9,317,948 B2 | 4/2016 | Tapply et al. | |
| 10,810,784 B1 | 10/2020 | Rai et al. | |
| 2009/0315908 A1 | 12/2009 | Comparan et al. | |
| 2013/0187920 A1 | 7/2013 | Osman | |
| 2017/0024905 A1* | 1/2017 | Wang | G09G 5/363 |
| 2017/0256025 A1* | 9/2017 | Abraham | G06T 1/60 |
| 2018/0293102 A1* | 10/2018 | Ray | G06F 9/4881 |
| 2019/0197760 A1* | 6/2019 | Cho | G06T 15/005 |
| 2022/0309732 A1* | 9/2022 | Woo | H04N 19/423 |
| 2023/0297508 A1* | 9/2023 | Zirr | G06F 12/0837 711/128 |

OTHER PUBLICATIONS

Igehy, Homan et al., Prefetching in a Texture Cache Architecture, Aug. 1, 1998, 11 pgs., Stanford University, Proceedings of the 1998 Eurographics/SIGGRAPH Workshop on Graphics Hardware.
Fatahalian, Kayvon et al., Lecture 6: Texture, 38 pgs., CMU 15-869: Graphics and Imaging Architectures, Fall 2011. 38 pages.

* cited by examiner

*Primary Examiner* — James A Thompson
(74) *Attorney, Agent, or Firm* — MUNCY, GEISSLER, OLDS & LOWE, P.C.

(57) ABSTRACT

A texture prefetching apparatus in a graphics processing system having a texture memory is disclosed, comprising a first FIFO memory, a second FIFO memory, a main rasterizer, an auxiliary rasterizer and a cache data memory. The cache data memory is coupled between the first FIFO memory and the texture memory. The main rasterizer converts destination coordinates of a first pixel in a primitive into a cache entry and a tag for a first integer texel according to texture coordinates and destination coordinates of multiple vertices of the primitive. The auxiliary rasterizer coupled to the second FIFO memory converts destination coordinates of N second pixels in the primitive into multiple cache entries, multiple tags and multiple memory addresses for multiple second integer texels according to the texture coordinates and the destination coordinates of the multiple vertices, where N is a multiple of 4.

28 Claims, 12 Drawing Sheets

TEXTURE PREFETCHING SCHEME FOR GRAPHICS PROCESSING SYSTEM

BACKGROUND OF THE INVENTION

Field of the Invention

The invention relates to graphics processing, and more particularly, to an apparatus and method of prefetching texture data in graphics processing system.

Description of the Related Art

Caching and prefetching provide substantial performance gains in data-intensive systems that rely heavily on retrieved data. One field that is particularly data-intensive is rasterization, and in particular texture processing performed in a rasterization process utilized in various image processing applications. Rasterization is a process by which a Graphics Processing unit (GPU) finds all the pixels inside a primitive. A texture mapping algorithm is typically incorporated into a rasterization process to paint a texture onto geometric objects placed into a scene.

It is important to ensure that as much as possible of the required texture data is cached in a processor, as otherwise the time required to retrieve the texture data from Dynamic Random Access Memories (DRAM) into the cache memory would introduce substantial delays in texture mapping. However, with larger textures, the texture data will often span numerous cache lines, so the required texture data is often not cached when it is needed by texture mapping, leading to unacceptable performance degradation.

Therefore, a need exists in the art for a manner of reducing the time required for accessing texture memory as much as possible, avoiding the majority of stalling on cache misses and improving the performance of texture mapping or the rasterization process.

SUMMARY OF THE INVENTION

In view of the above-mentioned problems, an object of the invention is to provide a texture prefetching apparatus for use in a graphics processing system, thereby to reduce the time required for accessing texture memory as much as possible, avoid the majority of stalling on cache misses and improve the performance of texture mapping or the rasterization process.

One embodiment of the invention provides a texture prefetching apparatus in a graphics processing system having a texture memory. The texture prefetching apparatus comprises a first FIFO memory, a second FIFO memory, a main rasterizer, an auxiliary rasterizer and a cache data memory. The main rasterizer comprising a first tag table and is coupled to the first FIFO memory and configured to perform a set of first operations comprising: (1) converting destination coordinates of a first pixel in a primitive into a cache entry and a tag for a first integer texel according to texture coordinates and destination coordinates of multiple vertices of the primitive, (2) looking up the tag in the first tag table, (3) sending a hit flag and the cache entry to the first FIFO memory if a result of looking up the tag is a cache hit, and (4) updating the tag in the first tag table and sending a miss flag and the cache entry to the first FIFO memory if the result of looking up the tag is a cache miss. The second FIFO memory is coupled to the texture memory. The auxiliary rasterizer having a second tag table is coupled to the second FIFO memory and configured to perform a set of second operations comprising: (a) converting destination coordinates of N second pixels in the primitive into multiple cache entries, multiple tags and multiple memory addresses for multiple second integer texels according to the texture coordinates and the destination coordinates of the multiple vertices of the primitive, (b) looking up the multiple tags in the second tag table, and (c) updating a corresponding tag in the second tag table and sending a corresponding memory address to the second FIFO memory if a result of looking up the multiple tags is a cache miss for anyone of the multiple second integer texels, where N is a multiple of 4. The cache data memory is coupled to the first FIFO memory and the texture memory. The first and the multiple second integer texels have integer texture coordinates. The main and the auxiliary rasterizers operate in parallel.

Another embodiment of the invention provides a texture prefetching method applied to a graphics processing system comprising a texture memory, a first FIFO memory, a second FIFO memory and a cache data memory. The cache data memory is coupled between the first FIFO memory and the texture memory, and the second FIFO memory is coupled to the texture memory. The method comprises: at a main rasterizer having a first tag table, (1) converting destination coordinates of a first pixel in a primitive into a cache entry and a tag for a first integer texel according to texture coordinates and destination coordinates of multiple vertices of the primitive; (2) looking up the tag in the first tag table; (3) sending a hit flag and the cache entry to the first FIFO memory if a result of looking up the tag is a cache hit; and (4) updating the tag in the first tag table and sending a miss flag and the cache entry to the first FIFO memory if the result of looking up the tag is a cache miss; at an auxiliary rasterizer having a second tag table, (a) converting destination coordinates of N second pixels in the primitive into multiple cache entries, multiple tags and multiple memory addresses for multiple second integer texels according to texture coordinates and destination coordinates of multiple vertices of the primitive; (b) looking up the multiple tags in the second tag table; and, (c) updating a corresponding tag in the second tag table and sending a corresponding memory address to the second FIFO memory if a result of looking up the multiple tags is a cache miss for anyone of the multiple second integer texels, where N is a multiple of 4. The first and the multiple second integer texels have integer texture coordinates. The steps (1) to (4) and the steps (a) to (c) are performed in parallel.

Another embodiment of the invention provides a texture prefetching apparatus in a graphics processing system having a texture memory. The texture prefetching apparatus comprises a pixel FIFO, a memory request FIFO, a main rasterizer, an auxiliary rasterizer and a cache data memory. The pixel FIFO comprises a syn pixel FIFO. The memory request device is coupled to the texture memory and comprises a direct memory request FIFO and a sync memory request FIFO. The auxiliary rasterizer comprising a tag table and is coupled to the pixel FIFO and the memory request device and configured to perform a set of first operations comprising: (a) converting destination coordinates of a given pixel in a next primitive into a first cache entry, a tag and a memory address for a given integer texel having integer texture coordinates according to texture coordinates and destination coordinates of multiple vertices of a next primitive, (b) looking up the tag in the tag table, (c) sending the first cache entry to the sync pixel FIFO and the memory address to the sync memory request FIFO if a result of looking up is a cache miss and a corresponding cache line is occupied by texels of a current primitive, and (d) sending the first cache entry to the pixel FIFO and the memory address to the direct memory request FIFO if the result of looking up is a cache miss and the corresponding cache line is not occupied by the texels of the current primitive. The cache data memory is coupled to the pixel FIFO and the texture memory. The main rasterizer is coupled to the cache data memory and configured to perform a set of second operations comprising: (1) performing rendering processes for the current primitive; (2) sequentially updating the cache data memory with data from the texture memory according to second cache entries from the pixel FIFO, and (3) sequentially updating the cache data memory with data from the texture memory according to third cache entries from the sync pixel FIFO after the second operations (1) and (2) are completed, wherein the second operations (1) and (2) and the first operations (a) to (d) are performed in parallel.

Another embodiment of the invention provides a texture prefetching method applied to a graphics processing system comprising a texture memory, a pixel FIFO, a memory request device and a cache data memory. The cache data memory is coupled between the pixel FIFO and the texture memory, and the memory request device is coupled to the texture memory. The pixel FIFO comprises a syn pixel FIFO, and the memory request device comprises a direct memory request FIFO and a sync memory request FIFO. The method comprises: at an auxiliary rasterizer having a tag table, (a) converting destination coordinates of a given pixel in a next primitive into a first cache entry, a tag and a memory address for a given integer texel having integer texture coordinates according to texture coordinates and destination coordinates of multiple vertices of a next primitive; (b) looking up the tag in the tag table; (c) sending the first cache entry to the sync pixel FIFO and the memory address to the sync memory request FIFO if there is a cache miss and a corresponding cache line is occupied by texels of a current primitive; and (d) sending the first cache entry to the pixel FIFO and the memory address to the direct memory request FIFO if there is a cache miss and the corresponding cache line is not occupied by the texels of the current primitive; at a main rasterizer, (f) performing rendering processes for the current primitive; (g) sequentially updating the cache data memory with data from the texture memory according to second cache entries from the pixel FIFO; and (h) sequentially updating the cache data memory with data from the texture memory according to third cache entries from the sync pixel FIFO after the steps (f) and (g) are completed; wherein the steps (f), (g) and the steps (a) to (d) are performed in parallel.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
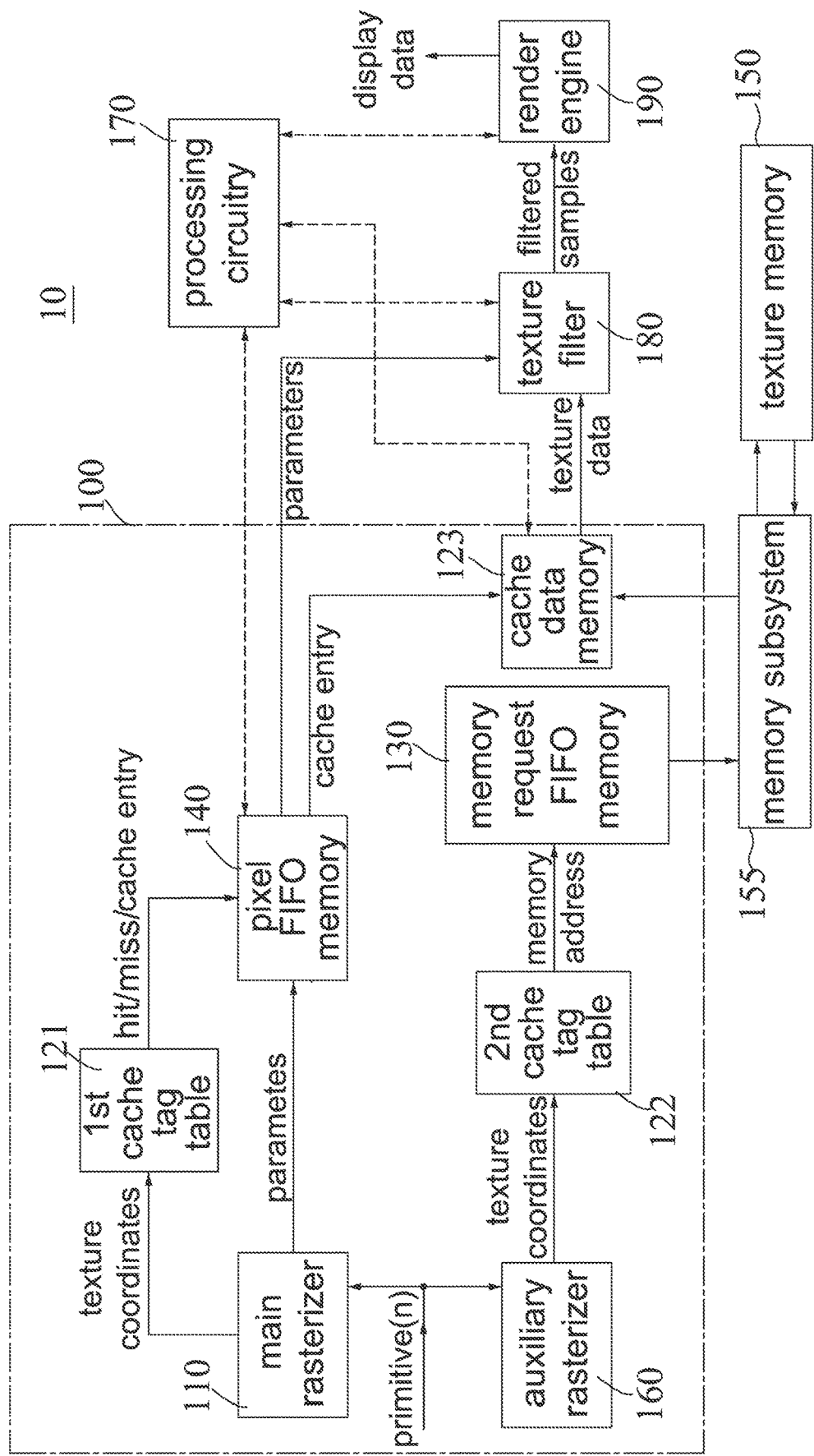
FIG. 1 is a diagram of a texture prefetching apparatus in a graphics processing system according to an embodiment of the invention.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

Figure 2A:
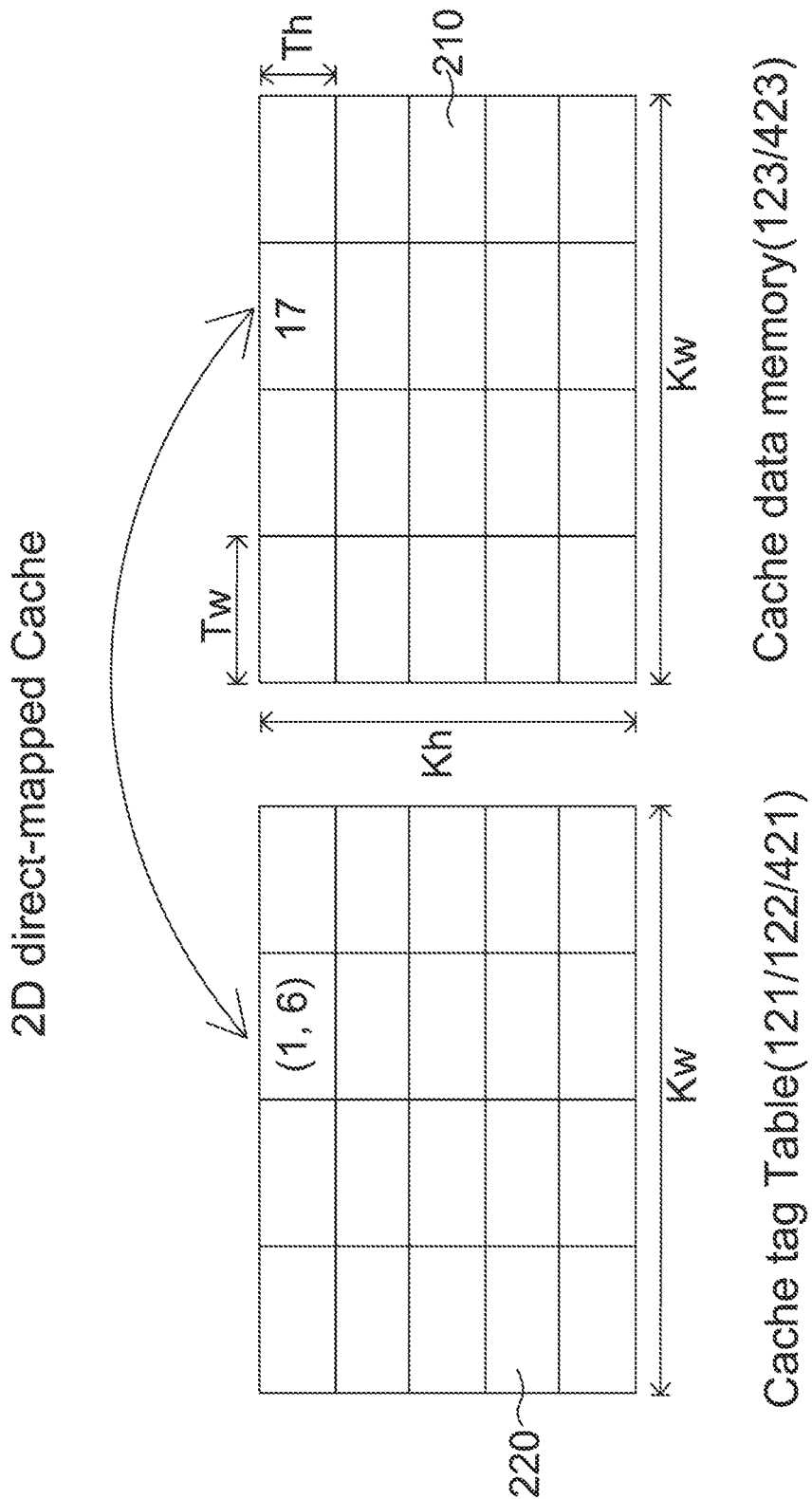
FIG. 2A shows an example of two-dimensional direct-mapped cache data memory according to the invention.

Generally, graphics processing is carried out by dividing the scene (or destination space) into a number of similar basic components or "primitives", which primitives are then subjected to the desired graphics processing operations. The primitives are usually in the form of simple polygons, such as triangles or quadrilaterals, and are usually described by defining their vertices as shown in FIG. 2C. In order to paint a texture onto a placed object in the scene, for each pixel (having destination coordinates (e.g., x and y)) in each primitive making up the object, a corresponding texel (having texture coordinates (e.g., u and v)) in texture space is calculated. The fundamental elements in a texture space are referred to as texels, and each texel is associated with a color. Each texel has unique texture coordinates in the texture space.

FIG. 1 is a diagram of a texture prefetching apparatus in a graphics processing system according to an embodiment of the invention. Referring to FIG. 1, a graphics processing system 10 includes a texture prefetching apparatus 100, a memory subsystem 155, a texture memory 150, processing circuitry 170, a texture filter 180 and a render engine 190. The texture prefetching apparatus 100 is configured to provide colors of multiple integer texels (hereinafter called "texture data"), whose texture coordinates are integers, along with related parameters for each pixel in a given primitive. The texture memory 150, implemented by DRAM or Static Random Access Memories (SRAM), stores the colors of all integer texels i.e., the whole texture data. The memory subsystem 155 includes, without limitations, a memory agent, a memory controller, a memory bus (not shown) and the like. The memory subsystem 155 is used to manage the data flow and memory requests between the texture prefetching apparatus 100 and the texture memory 150. The operations and the structure of the memory subsystem 155 are well known in the art, and thus detailed descriptions are omitted herein. The processing circuitry 170 instructs the pixel FIFO memory 140, the cache data memory 123, the texture filter 180 and the render engine 190 to operate. The texture filter 180 is used to produce a color of each filtered sample, using the colors of integer texels calculated from a given pixel in a given primitive. The render engine 190 then performs a number of rendering processes, such as texture blending, shading, etc. on the filtered samples to generate display data for the current primitive. Please note that a graphics processing system 10 in FIG. 1 is only provided for example and not limitations of the invention. The texture prefetching apparatus 100 is generally applicable to any type of graphics processing systems that perform texture mapping.

The texture prefetching apparatus 100 includes a main rasterizer (MR) 110, an auxiliary rasterizer (AR) 160, a pixel first-in, first-out (FIFO) memory 140, a first cache tag table 121, a second cache tag table 122, a memory request FIFO memory 130 and a cache data memory 123. The pixel FIFO memory 140 is used to store hit/miss flags, cache entries and related parameters for integer texels. The memory request FIFO memory 130 is used to store memory addresses for memory requests. Referring to FIG. 2A, the cache data memory 123 includes Kw×Kh cache lines 210 for storing texels and each cache line 210 includes Tw×Th texels, such as 16×1 texels or 4×4 texels, where Tw and Th denote the width and the height of each cache line 210 and are expressed in terms of texels, and Kw and Kh denote the width and the height of the cache data memory 123 and are expressed in terms of cache lines. The first cache tag table 121 resides within a buffer (not shown) of the MR 110 while the second cache tag table 122 resides within a buffer (not shown) of the AR 160. The first and the second cache tag tables 121-122 are used to uniquely identify the texture coordinates and keep track of the content of the cache lines. Each cache tag table 121/122 includes Kw×Kh tag cells 220, where each cell 220 stores a pair of tags and corresponds to one cache line 210 in cache data memory 123. That is, the number of cache lines 210 is equal to the number of tag cells 220.

In this invention, 2D direct mapping scheme is used to map texture coordinates (u, v) to one cache entry (s, t) and a tag pair (a, b). Specifically, regarding texture coordinates (u, v) of a texel in texture space, its unit position (c, d) is calculated as ($\lfloor u/Tw \rfloor$, $\lfloor v/Th \rfloor$). Then, its cache entry (s, t) is calculated as (c modulo Kw, d modulo Kh) and its tag pair is calculated as (a, b)=($\lfloor c/Kw \rfloor$, $\lfloor d/Kh \rfloor$), where the notation $\lfloor \ \rfloor$ denotes the floor function and u and v are integers. For example, as shown in FIG. 2A, assuming that (Kw, Kh)=(4,5), (Tw, Th)=(16, 1) and a texel having texture coordinates (100, 35) intends to be fetched from the cache data memory 123, then calculate its unit position (c, d)=($\lfloor 100/16 \rfloor$, $\lfloor 35/1 \rfloor$)=(6, 35). Next, calculate its cache entry (s, t)=(6 modulo 4, 35 modulo 5)=(2, 0) and its tag pair (a, b)=($\lfloor 6/4 \rfloor$, $\lfloor 35/5 \rfloor$)=(1, 6). Finally, since a tag pair (1, 6) is stored in the tag cell (2, 0) in cache tag table 121, it is a cache hit and then the value of 17 stored in a cache line with cache entry (2, 0) in the cache data memory 123 is fetched.

Figure 2B:
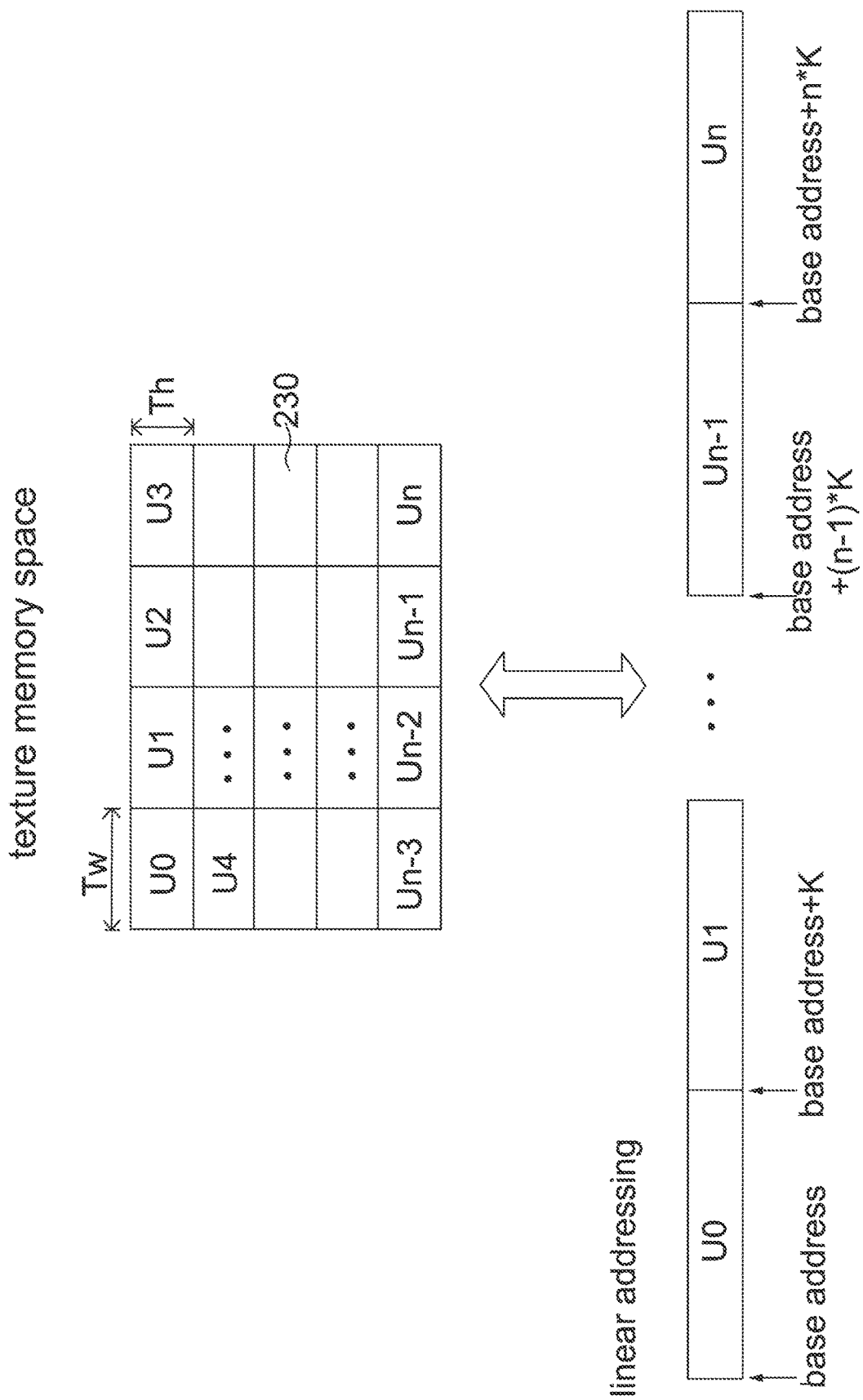
FIG. 2B shows concepts of memory units and linear addressing.
Figure 2C:
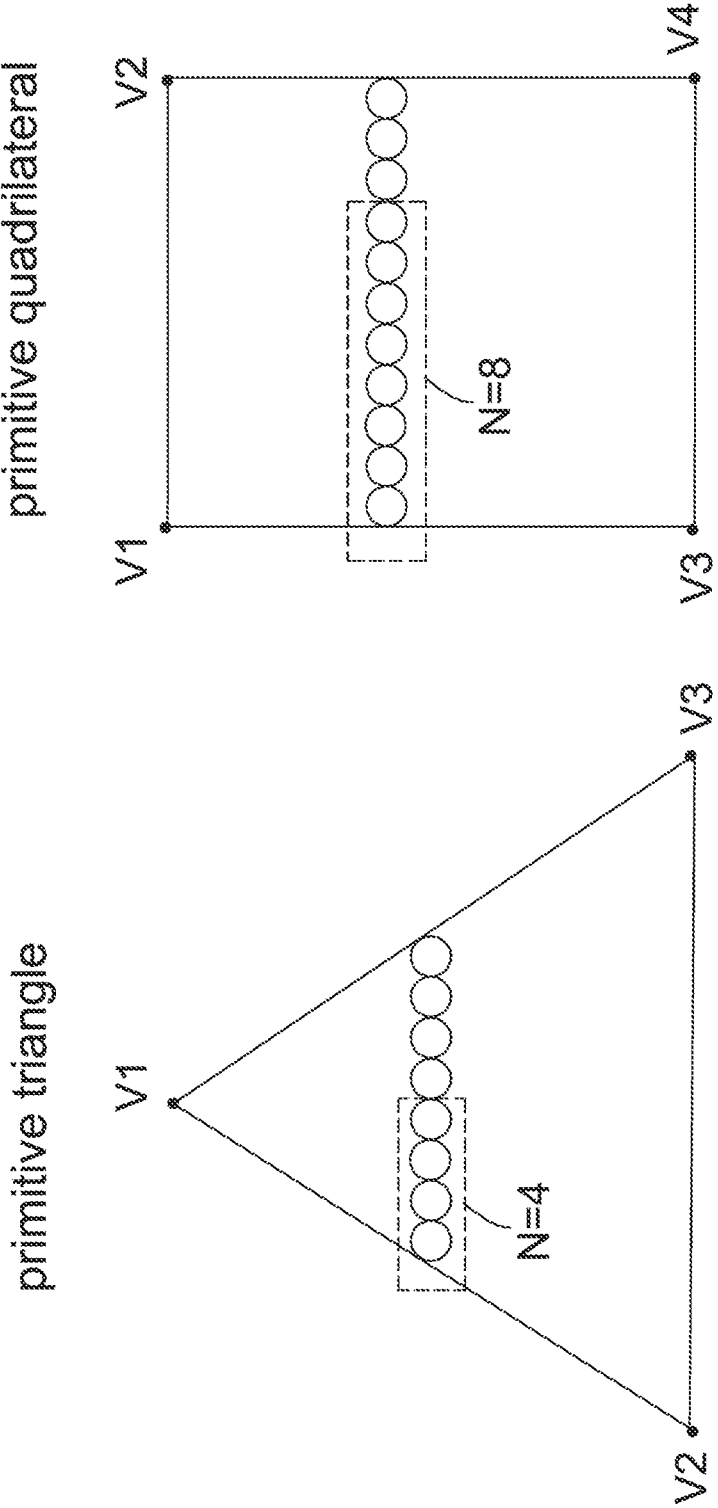
FIG. 2C shows an example of two primitives having shapes of a triangle and a quadrilateral.

FIG. 2B shows concepts of memory units and linear addressing according to the invention, where K=Tw×Th×m. Referring to FIG. 2B, a portion of the texture memory 150, starting from a base address BA (the top left corner), is divided into multiple memory units 230. Linear addressing is used to map texture coordinates (u, v) of a texel in texture space to a memory address ADS in memory apace for reading the texture data (i.e., the colors of integer texels) in the texture memory 150. In memory space, the memory addresses are expressed in terms of bytes. There are Tw×Th texels in each memory unit 230 and each texel has different bits depending on different texel type. For example, 24 bits (m=3 bytes) per texel in YUV888 format; 16 bits (m=2 bytes) per texel in RGB565 format; 24 bits (m=3 bytes) per texel in RGB888 format; . . . and so on. Thus, in FIG. 2B, there are K (=Tw×Th×m) bytes in each memory unit 230. For texture coordinates (u, v) of a texel in texture space, its unit position (c, d) is calculated as ($\lfloor u/Tw \rfloor$, $\lfloor v/Th \rfloor$). Then, its memory address is calculated as ADS=(BA+(c×$\lceil Nx/Tw \rceil$+d)×K), where Nx denotes a texture image width and the notation $\lceil \ \rceil$ denotes the ceiling function.

Figure 3A:
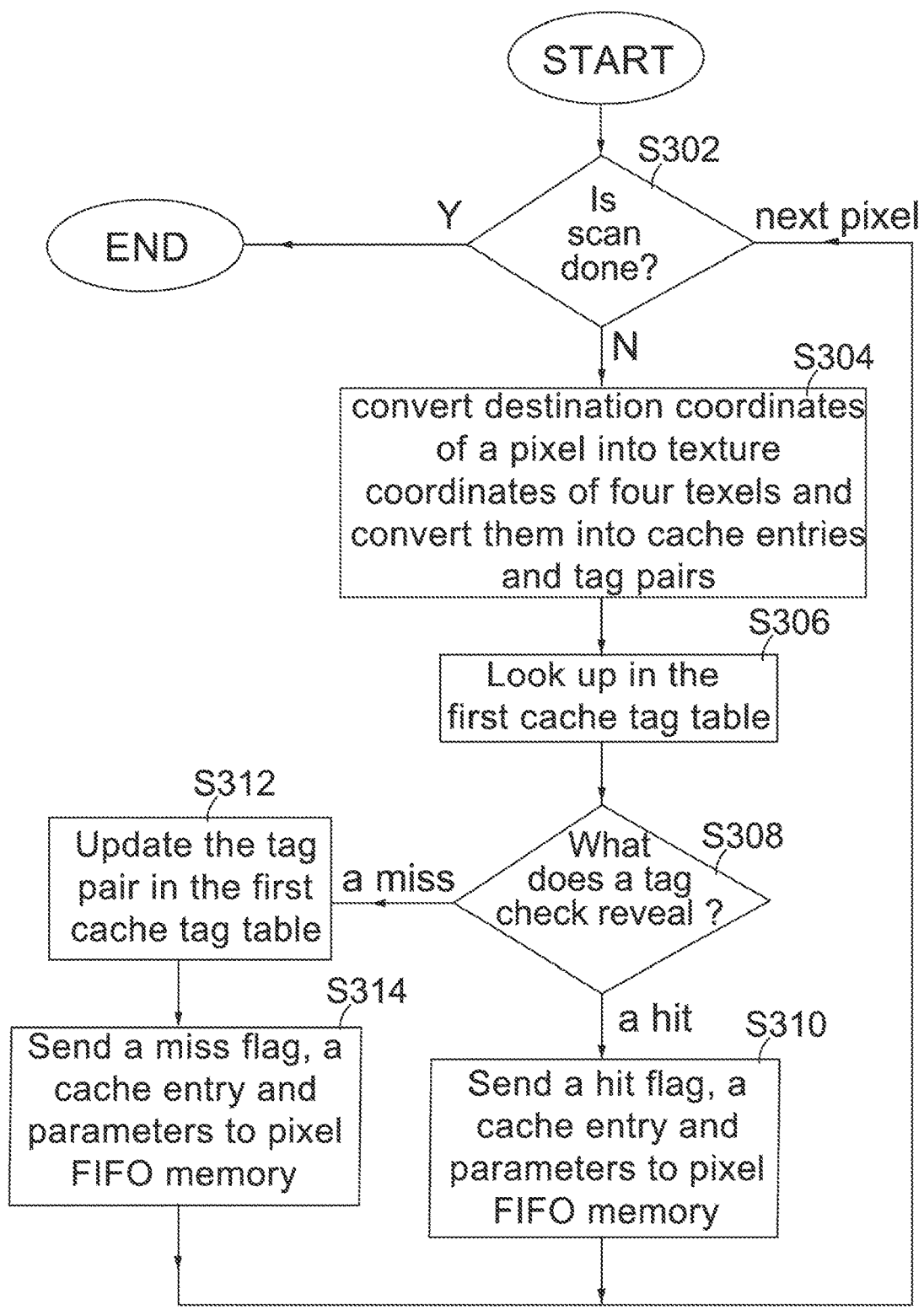
FIG. 3A is a flow chart showing operations of the MR 110 according to an embodiment of the invention.

Rasterization is the process whereby each individual primitive is broken down into discrete elements, such as pixels, based on the sample coverage of the primitive. The texture prefetching apparatuses 100/400 are described below with assumption that the input primitives are triangles. FIG. 3A is a flow chart showing operations of the MR 110 according to an embodiment of the invention. The operations of the MR 110 are described below with reference to FIGS. 1 and 3A. The MR 110 receives a primitive (n) and its three vertices (e.g., V1~V3 in FIG. 2C) with texture coordinates and destination coordinates in advance.

Step S302: Determine whether rasterizing (or scanning) a primitive (n) is done. If Yes, the flow is terminated; otherwise, the flow goes to step S304.

Step S304: Convert destination coordinates of a given pixel P in the primitive (n) into four texture coordinates of four surrounding integer texels T1~T4 according to a plane equation and the texture coordinates and the destination coordinates of the three vertices of the primitive (n), and convert texture coordinates of each of the four surrounding integer texels into a cache entry and a tag pair. For a plane equation given by: Value=A×x+B×y+C, the coefficients Au, Bu and Cu for u-axis and the coefficients Av, Bv and Cv for v-axis are respectively obtained by using the texture coordinates and the destination coordinates of the three vertices. After that, if the given pixel P has destination coordinates (x1, y1), then its corresponding texture coordinates T(u1, v1) in texture space are obtained by calculating u1=Au×x1+Bu×y1+Cu and v1=Av×x1+Bv×y1+Cv. Since u1 and v1 are floating numbers, the color of T(u1, v1) is determined by colors of its four surrounding integer texels T1($u_i$, $v_i$), T2($u_{i+1}$, $v_i$), T3($u_i$, $v_{i+1}$), T4($u_{i+1}$, $v_{i+1}$), where $u_i$=floor(u1) and $v_i$=floor(v1). Then, texture coordinates of each of the four surrounding integer texels T1~T4 are converted into a cache entry and a tag pair (please refer to the description related to FIG. 2A).

Step S306: Look up the tag pair of each of the four surrounding integer texels T1~T4 in the first cache tag table 121 according to its corresponding cache entry.

Step S308: Determine what the tag check reveals for the four surrounding integer texels T1~T4. If the tag check reveals a miss, the flow goes to step S312; otherwise, the flow goes step S310.

Step S310: Send a hit flag, the cache entry and related parameters for each hit integer texel to the pixel FIFO memory 140. The related parameters, including color, depth, filtering information and blending information, are needed to process the given pixel P in rendering processes.

Step S312: Update the tag pair in the first cache tag table 121 for each missed integer texel according to its cache entry.

Step S314: Send a miss flag, the cache entry and related parameters for each missed surrounding integer texel to the pixel FIFO memory 140.

Figure 3B:
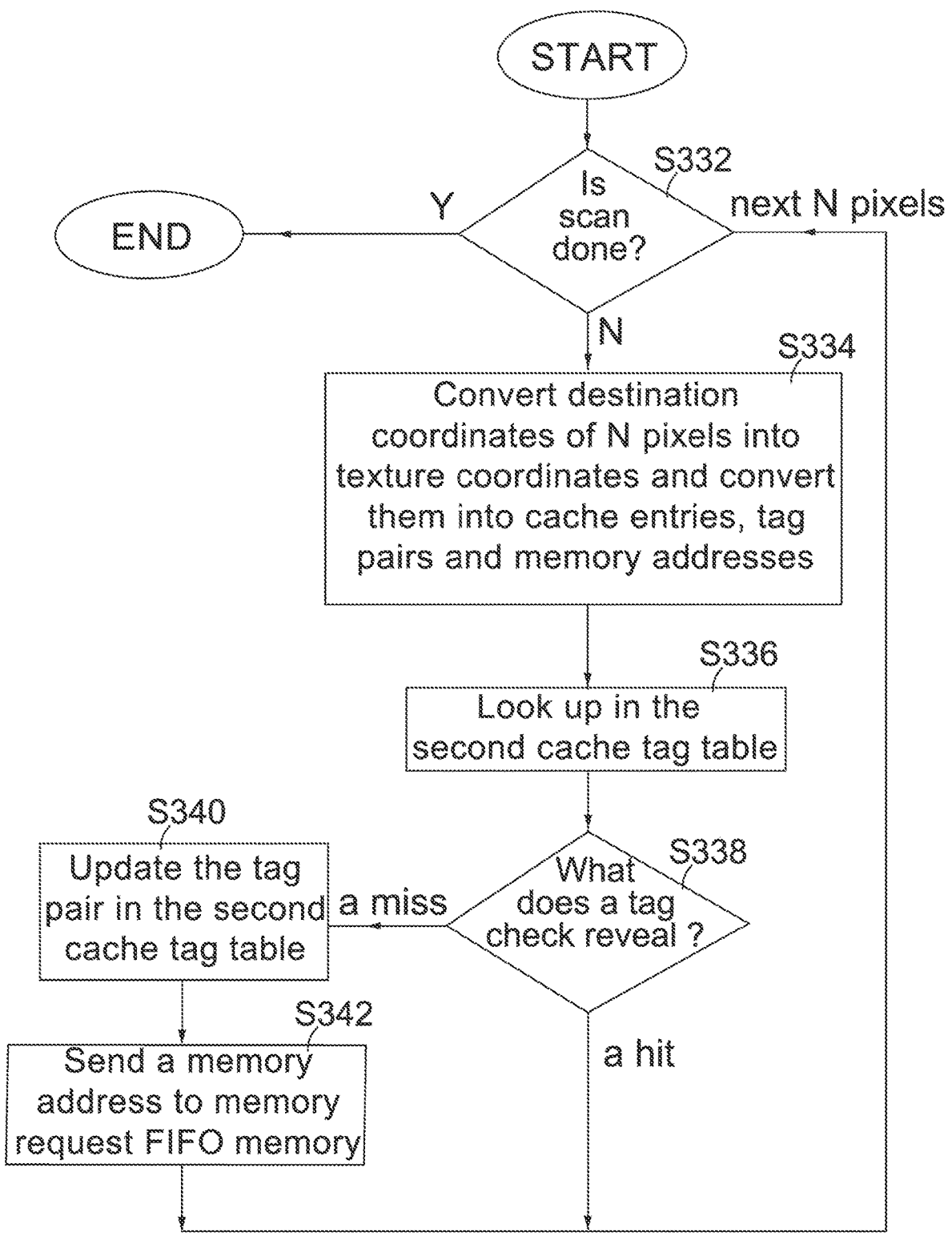
FIG. 3B is a flow chart showing operations of the AR 160 according to an embodiment of the invention.

FIG. 3B is a flow chart showing operations of the AR 160 according to an embodiment of the invention. The operations of the AR 160 are described below with reference to FIGS. 1 and 3B. The AR 160 receives a primitive (n) and its three vertices (e.g., V1~V3 in FIG. 2C) with texture coordinates and destination coordinates in advance. Please note that the AR 160, the MR 110 and the processing circuitry 170 operate in parallel.

Step S332: Determine whether rasterizing a primitive (n) is done. If Yes, the flow is terminated; otherwise, the flow goes to step S334.

Step S334: Convert destination coordinates of N pixels in a row at a time in the primitive (n) into texture coordinates of 4×N surrounding integer texels according to a plane equation and the texture coordinates and the destination coordinates of the three vertices, and convert the texture coordinates of each of the 4×N surrounding integer texels into a cache entry, a tag pair and a memory address, where N is a multiple of 4 as shown in FIG. 2C. Regarding how to convert, please refer to step S304 and related description of FIG. 2B.

Step S336: Look up the tag pair of each of the 4×N surrounding integer texels in the second cache tag table 122 according to its corresponding cache entry.

Step S338: Determine what the tag check reveals for the 4×N surrounding integer texels. If the tag check reveals a miss for at least one of the 4×N surrounding integer texels, the flow goes to step S340; otherwise, the flow returns to step S332.

Step S340: Update the tag pair in the second cache tag table 122 for each missed integer texel according to its cache entry.

Step S342: Send a memory request to the memory request FIFO memory 130. Then, return to step S332 for the next N pixels.

Since the number of pixels that the AR 160 processes at a time are N times greater than the number of pixels that the MR 110 processes and the AR 160 only deals with cache misses, the AR 160 operates faster than the MR 110. Thus, while checking texture data that are not available in the cache data memory 123, the AR 160 can prefetch from the texture memory 150. It avoids the majority of stalling on cache misses.

Figure 3C:
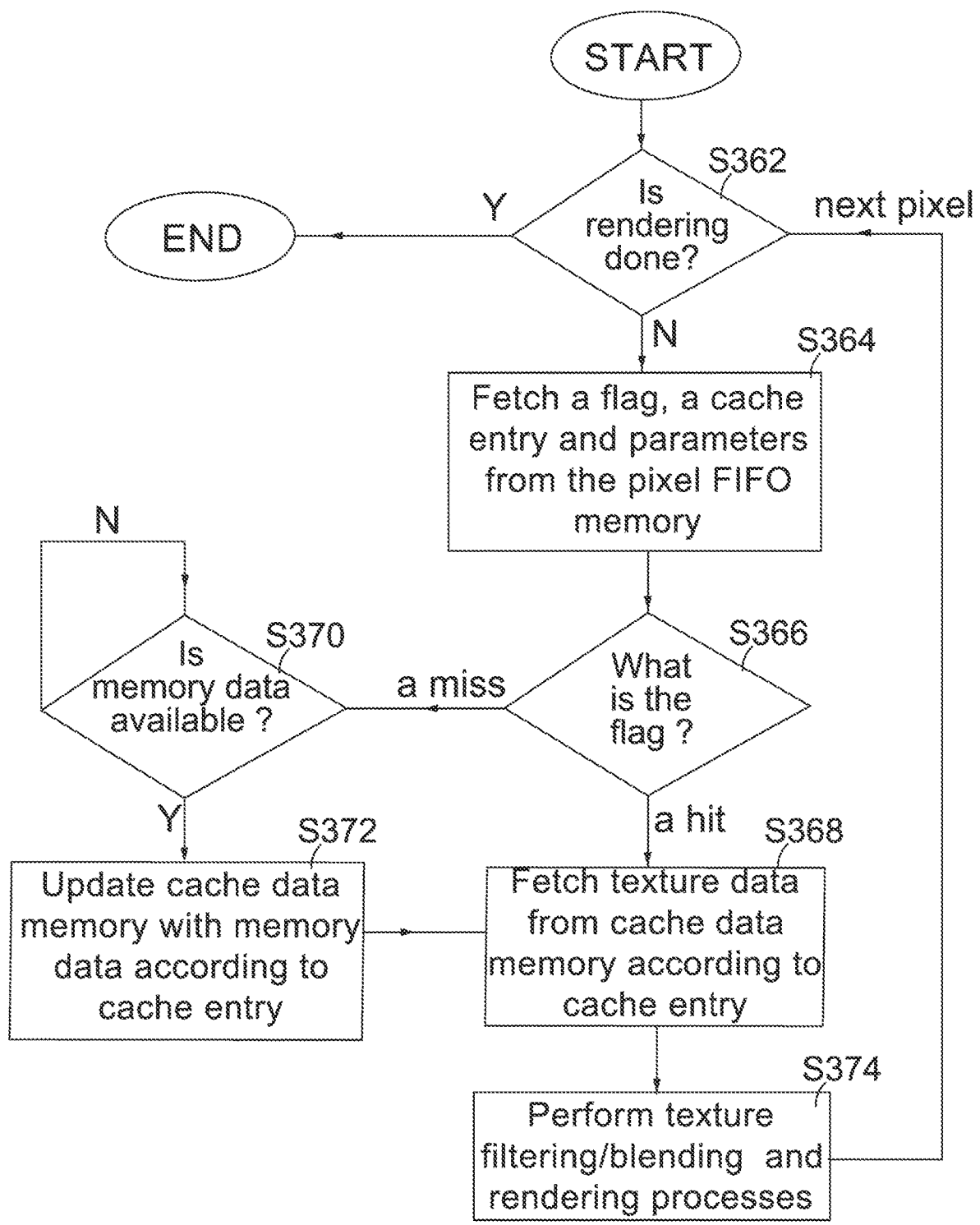
FIG. 3C is a flow chart showing operations of the processing circuitry 170 according to an embodiment of the invention.

FIG. 3C is a flow chart showing operations of the processing circuitry 170 according to an embodiment of the invention. The operations of the processing circuitry 170 are described below with reference to FIGS. 1 and 3C.

Step S362: Determine whether rendering a primitive (n) is done. If Yes, the flow is terminated; otherwise, the flow goes to step S364.

Step S364: Fetch a flag, the cache entry and related parameters for each of the four surrounding integer texels T1~T4 (related to the given pixel P) from the pixel FIFO memory 140.

Step S366: Determine what the flag is. If it is a miss flag, the flow goes to step S370; If it is a hit flag, the flow goes to step S368.

Step S368: Fetch texture data (i.e., colors of integer texels) from the cache data memory 123 according to the cache entry and send the texture data to the texture filter 180.

Step S370: Determine whether memory data are back from the texture memory 150. If No, the flow keeps waiting; otherwise, the flow goes to step S372.

Step S372: Update the cache data memory 123 with the memory data according to the cache entry.

Step S374: Instruct the texture filter 180 to perform texture filtering and blending according to the parameters and the texture data from the cache data memory 123 to generate a filtered sample, and instruct the rendering engine 190 to perform rendering processes (such as shading) on filtered samples to generate rendered pixels for display.

Figure 4A:
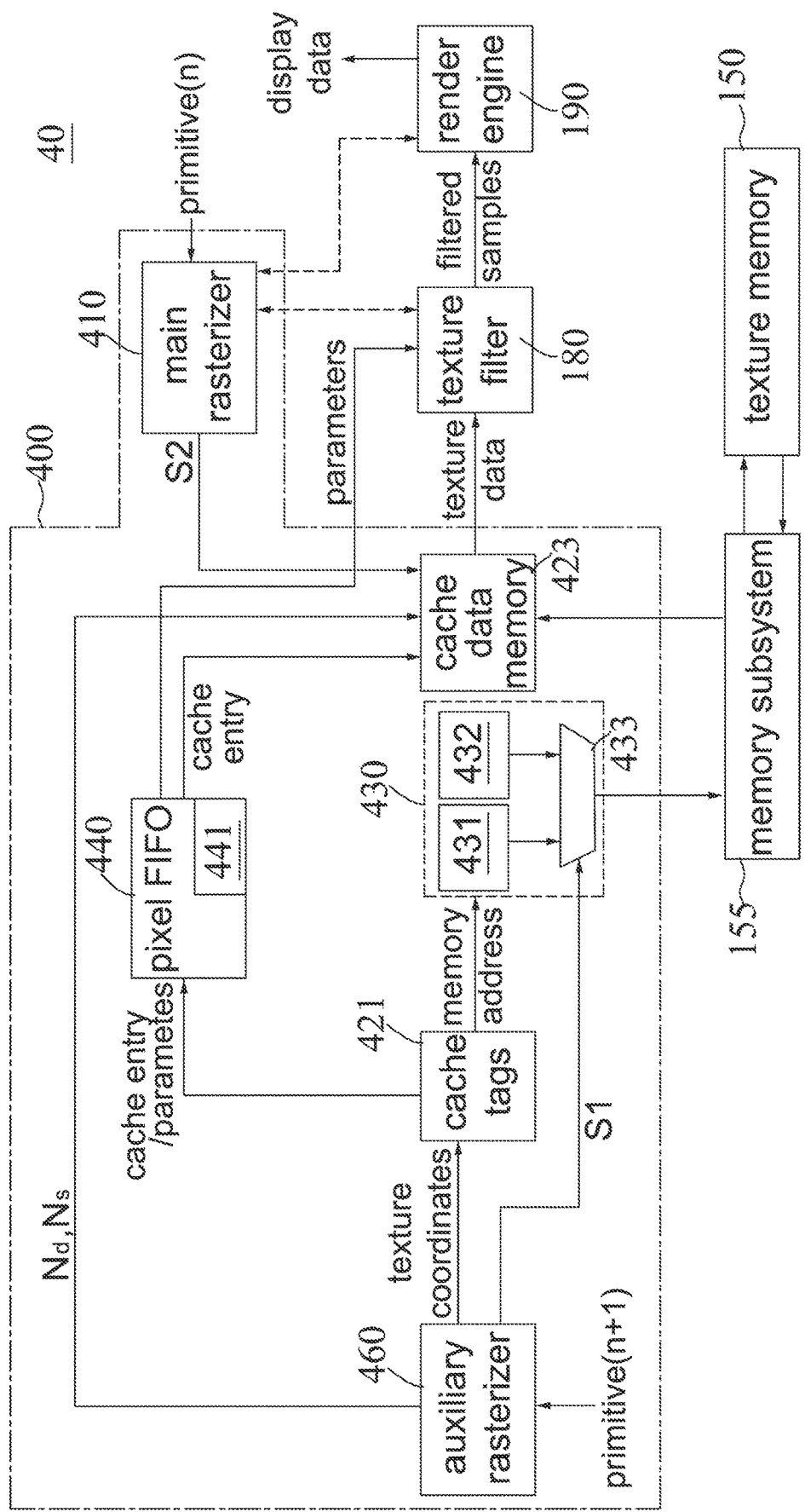
FIG. 4A is a diagram of a texture prefetching apparatus in a graphics processing system according to another embodiment of the invention.

FIG. 4A is a diagram of a texture prefetching apparatus in a graphics processing system according to another embodiment of the invention. Referring to FIG. 4A, a graphics processing system 40 includes a texture prefetching apparatus 400, a memory subsystem 155, a texture memory 150, a texture filter 180 and a render engine 190. The texture prefetching apparatus 400 includes a main rasterizer (MR) 410, an auxiliary rasterizer (AR) 460, a pixel FIFO memory 440 (including a sync pixel FIFO memory 441), a cache tag table 421, a memory request device 430 (including a sync memory request FIFO memory 431, a direct memory request FIFO memory 432 and a multiplexer 433) and a cache data memory 423. The pixel FIFO memory 440 and the sync pixel FIFO memory 441 are used to store cache entries and related parameters for multiple integer texels. The sync memory request FIFO memory 431 and the direct memory request FIFO memory 432 are used to store memory addresses for memory requests. The number of cache lines 210 in cache data memory 423 is equal to the number of tag cells 220 in the cache tag table 421 as shown in FIG. 2A. Each cell 220 in the cache tag table 421 stores a pair of tags and corresponds to one cache line 210 in cache data memory 423. Please note that a graphics processing system 40 in FIG. 4A is only provided for example and not limitations of the invention. The texture prefetching apparatus 400 is generally applicable to any type of graphics processing systems that perform texture mapping.

To avoid the majority of stalling on cache misses, the MR 410 is used to perform rendering processes for a current primitive (n) while the AR 460 is used to prefetch texture data for a next primitive (n+1).

Figure 4B:
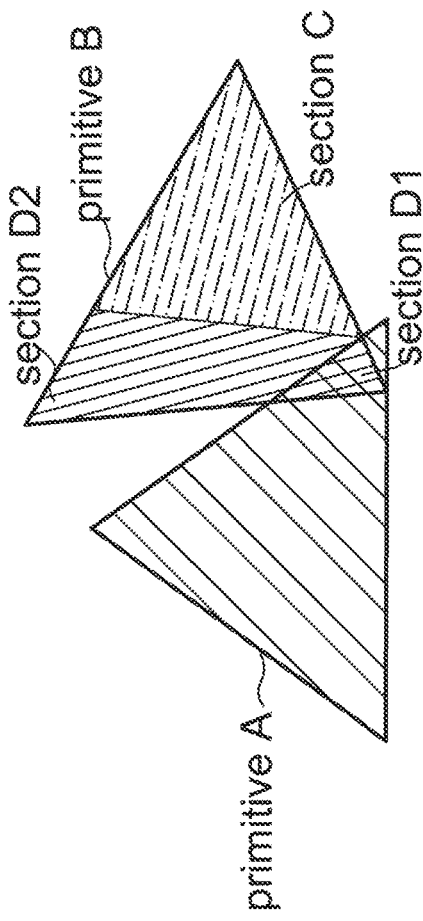
FIG. 4B shows an example that texels of a primitive A and a primitive B in cache data memory 423 correspond to pixels of the current primitive (n) and the next primitive (n+1) in destination space.

FIG. 4B shows an example that texels of a primitive A and a primitive B in cache data memory 423 correspond to pixels of the current primitive (n) and the next primitive (n+1) in destination space. The primitive B (corresponding to the next primitive (n+1)) consists of a section C and a section D. The section C denotes texture data is found in cache data memory 423 (cache hit) while the section D denotes texture data is not found in cache data memory 423 (cache miss). The section D is divided into two sections D1 and D2. The section D1 (=D∩A) denotes the intersection of the section D and the primitive A, i.e., having the same cache entry but different tag pairs. The section D2 (=D−D1) denotes a part of the section D doesn't have any intersection with the primitive A, i.e., having different cache entries.

Thus, during rendering the current primitive (n), the cache data memory 423 can be updated with texture data (hereafter called "direct data") related to the section D2 from the texture memory 150 and the memory request to the texture memory 150 for the direct data is hereinafter called "direct memory request". However, the cache data memory 423 is not allowed to be updated with texture data (hereafter called "sync data") related to the section D1 from the texture memory 150 until rendering the current primitive (n) is completed; the memory request to the texture memory 150 for the sync data is hereinafter called "sync memory request". Please note that all the sync memory request would be hold (would not be issued) in the sync memory request FIFO memory 431 until all the direct memory requests are issued. When the direct data arrives, the cache data memory 423 can be directly updated according to its cache entry. However, after the MR 410 is done with rendering the current primitive (n), the cache data memory 423 can be updated with the sync data according to its cache entry.

Figure 4C:
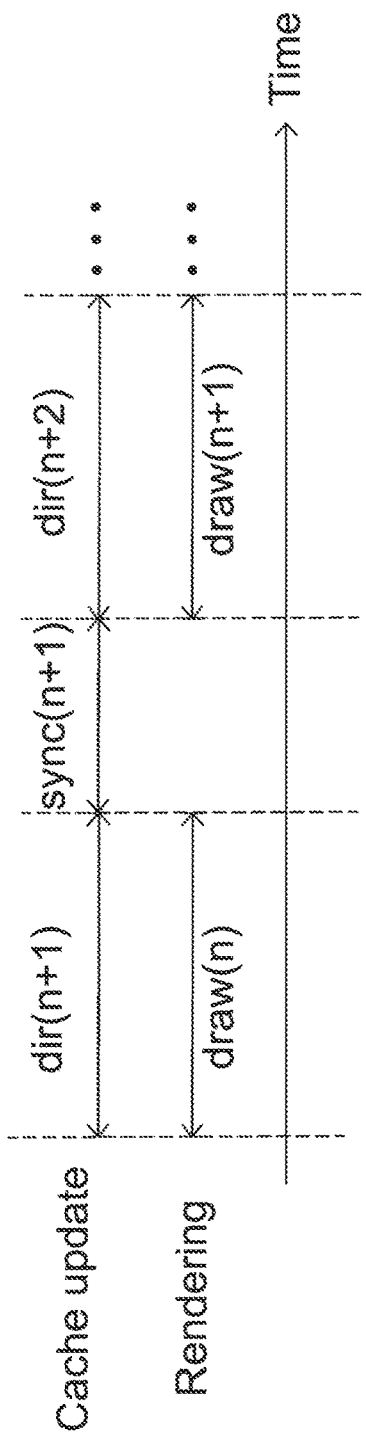
FIG. 4C is a timing diagram of cache update for the next primitive (n+1) and rendering for the current primitive (n).
Figure 5A:
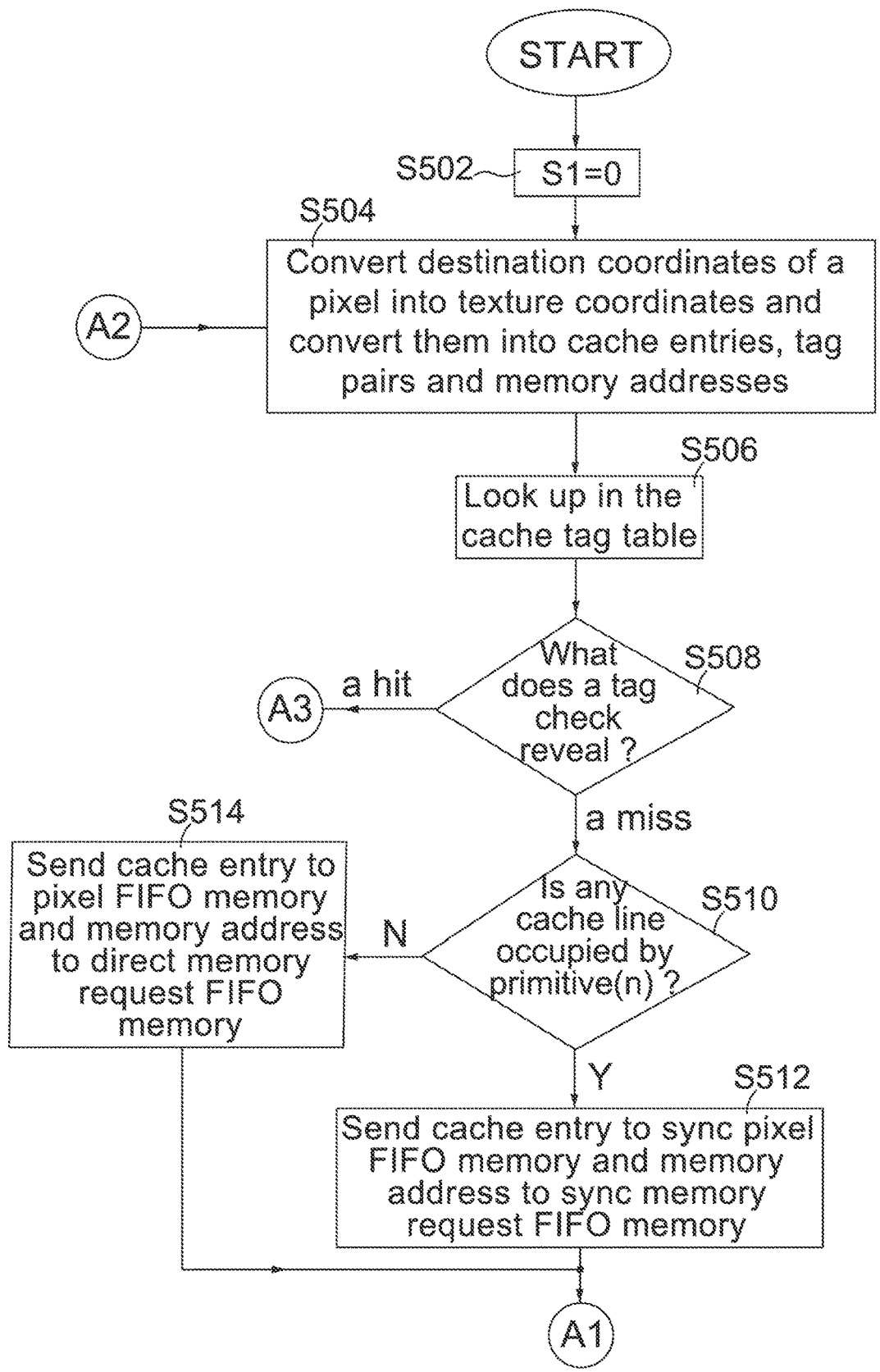
FIGS. 5A-5B show a flow chart illustrating operations of the AR 460 according to another embodiment of the invention.
Figure 5B:
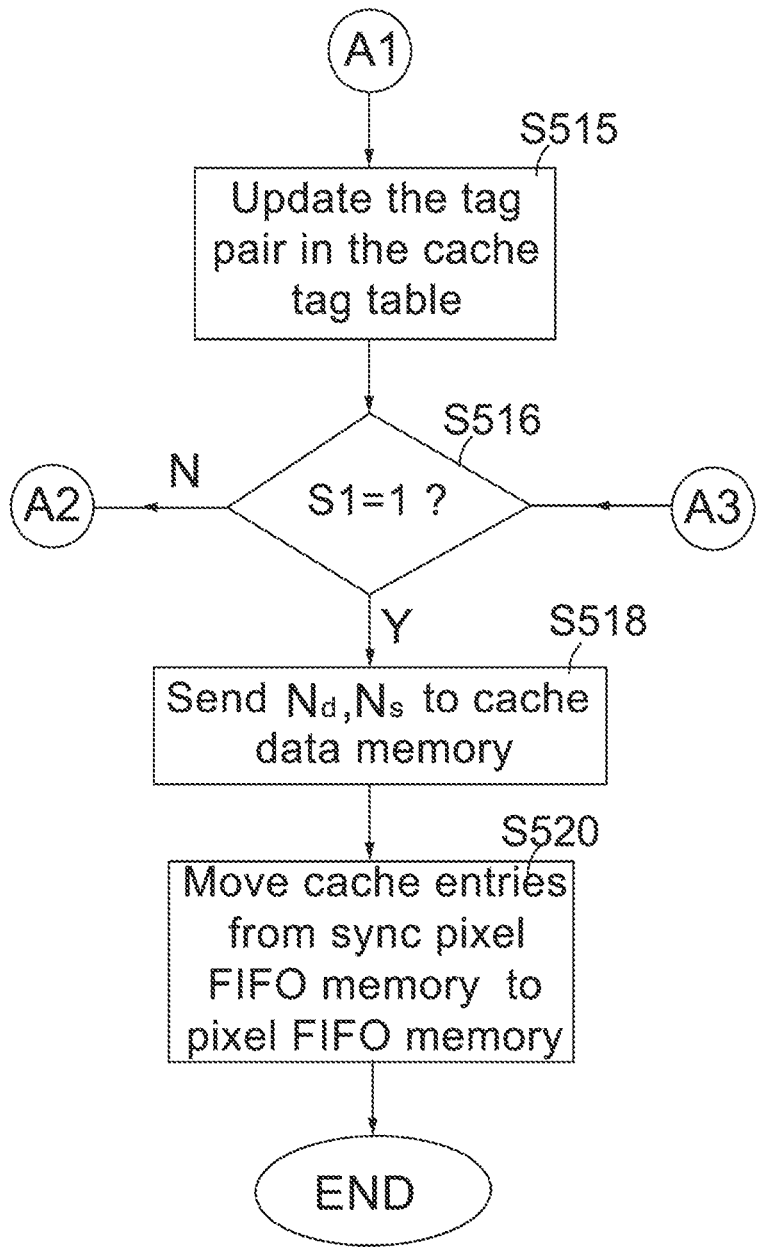
Figure 5C:
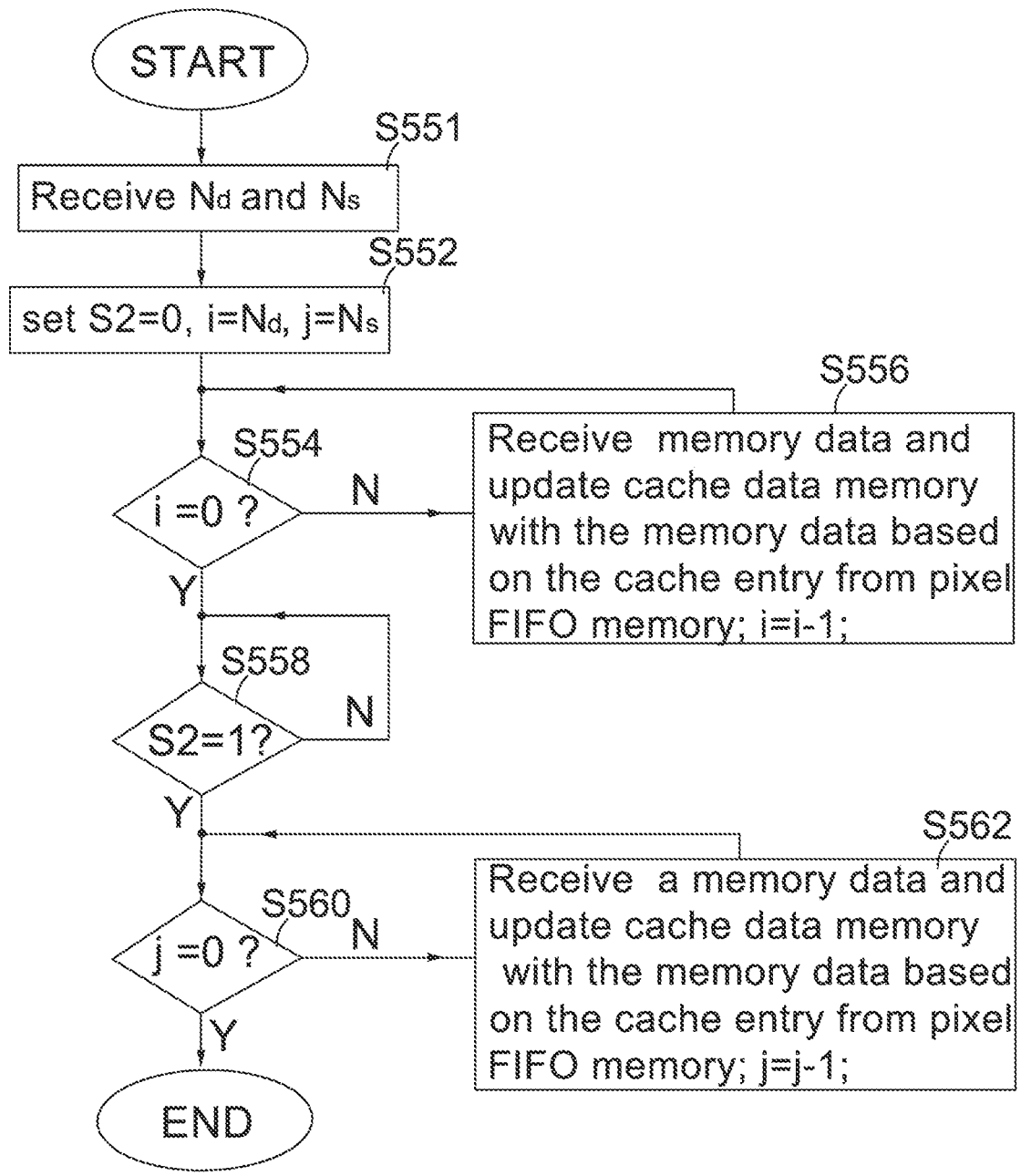
FIG. 5C is a flow chart showing operations of the MR 410 according to another embodiment of the invention.

FIG. 4C is a timing diagram of cache update for the next primitive (n+1) and rendering for the current primitive (n), where dir(n+1) denotes issuing direct memory requests and updating the cache data memory 423 with the memory data (i.e., direct data) for the next primitive (n+1), draw (n) denotes rendering the current primitive (n) and sync (n+1) denotes issuing sync memory requests and updating the cache data memory with the memory data (i.e., sync data) for the next primitive (n+1) (see descriptions related to FIGS. 5B-5C). Obviously, the intervals of cache update for the next primitive (n+1) and rendering for the current primitive (n) overlap, thereby to avoid the majority of stalling on cache misses.

FIGS. 5A-5B show a flow chart illustrating operations of the AR 460 according to another embodiment of the invention. The operations of the AR 460 are described below with reference to FIGS. 4A-4C and 5A-5B. The AR 460 receives a next primitive (n+1) and its three vertices (e.g., V1~V3 in FIG. 2C) with texture coordinates and destination coordinates in advance.

Step S502: Set a control signal S1 to 0 for initialization. "S1=0" indicates rasterizing/scanning the next primitive (n+1) is ongoing.

Step S504: Convert destination coordinates of a given pixel in the next primitive (n+1) into texture coordinates of four surrounding integer texels according to a plane equation and the texture coordinates and the destination coordinates of the three vertices of the primitive (n+1), and convert texture coordinates of each of the four surrounding integer texels into a cache entry, a tag pair and a memory address. Regarding how to convert, please refer to step S304 and related description of FIG. 2B.

Step S506: Look up the tag pair of each of the four surrounding integer texels in the cache tag table 421 according to its corresponding cache entry.

Step S508: Determine what the tag check reveals for the four surrounding integer texels. If the tag check reveals a miss for at least one of the four surrounding integer texels, the flow goes to step S510; otherwise, the flow goes to step S516.

Step S510: Determine whether a cache line is already occupied by texels related to the current primitive (n), that is, the section D1 (=D∩A). If YES, the flow goes to step S512; otherwise, the flow goes to step S514.

Step S512: Send the cache entry and related parameters to the sync pixel FIFO memory 441 and send the memory address to the sync memory request FIFO memory 431.

Step S514: Send the cache entry and related parameters to the pixel FIFO 440 and send the memory address to the direct memory request FIFO 432.

Step S515: Update the tag pair in the cache tag table 421 according to its cache entry.

Step S516: Determine whether S1 is equal to 1. "S1=1" indicates rasterizing the next primitive (n+1) is done. If YES, the flow goes to step S518; otherwise, the flow goes to step S504.

Step S518: Send the number $N_d$ of direct memory requests and the number $N_s$ of sync memory requests to the cache data memory 423.

Step S520: Move cache entries and related parameters from the sync pixel FIFO memory 441 to the pixel FIFO memory 440. Finally, the flow is terminated.

As set forth above, the control signal "S1=0" indicates AR 460 rasterizing the next primitive (n+1) is ongoing; "S1=1" indicates rasterizing the next primitive (n+1) by AR 460 is done. In the memory request device 430, when S1 is equal to 0, the multiplexer 433 sequentially outputs all direct memory requests in direct memory request FIFO memory 432 to the memory subsystem 155; when S1 is equal to 1, the multiplexer 433 sequentially outputs all syn memory requests in sync memory request FIFO memory 431 to the memory subsystem 155.

FIG. 5C is a flow chart showing operations of the MR 410 according to another embodiment of the invention. The operations of the MR 410 are described below with reference to FIGS. 4A-4C and 5C. Please note that the AR 460 and the MR 410 operate in parallel.

Step S551: Receives the number $N_d$ of direct memory requests and the number $N_s$ of sync memory requests by the cache data memory 423 from the AR 460.

Step S552: Set S2=0, i=$N_d$ and j=$N_s$. The control signal "S2=0" indicates rendering the current primitive (n) is ongoing. The MR 410 performs the rendering processes for a current primitive (n) similar to the steps S362~S374 in FIG. 3C.

Step S554: Check whether i is equal to 0. If YES, the flow goes to step S558; otherwise, the flow goes to step S556.

Step S556: Receive memory data from the texture memory 150 and update the cache data memory 423 with the memory data (i.e., direct data) according to the cache entry from the pixel FIFO memory 440. Then, the i value is decreased by 1 and the flow returns to step S554.

Step S558: Check whether S2 is equal to 1. If YES, the flow goes to step S560; otherwise, the flow keeps waiting. "S2=1" indicates rendering the current primitive (n) is complete.

Step S560: Check whether j is equal to 0. If YES, the flow is terminated; otherwise, the flow goes to step S562.

Step S562: Receive memory data from the texture memory 150 and update the cache data memory 423 with the memory data (i.e., sync data) according to the cache entry from the pixel FIFO 440. Then, the j value is decreased by 1 and the flow returns to step S560.

In an embodiment, the input primitives (n)/(n+1) in FIGS. 1 and 4A are quadrilaterals with four vertices V1~V4 as shown in FIG. 2C. If a given pixel P in an primitive (n)/(n+1) has destination coordinates (x1, y1), then its texture coordinates T(u1, v1) in texture space are obtained by using a bilinear interpolation equation (given by: Value=A×α×β+B×(1−α)×B+C×α×(1−β)+D×(1−α)×(1−β)) and the texture coordinates and the destination coordinates of four vertices V1~V4 as shown in FIG. 2C. Since u1 and v1 are floating numbers, the color of T(u1, v1) is also determined by colors of its four surrounding integer texels T1($u_i$, $v_i$), T2($u_{i+1}$, $v_i$), T3($u_i$, $v_{i+1}$), T4($u_{i+1}$, $v_{i+1}$), where $u_i$=floor(u1) and $v_i$=floor (v1).

The MRs 110/410 and the ARs 160/460 according to the invention may be implemented by a software program, custom circuitry (e.g., field programmable gate arrays (FP- GAs) or application specific integrated circuits (ASICs)), or by a combination of the custom circuitry and the software program. The processing circuitry 170 may be implemented with a FPGA design, an ASIC design, or a state machine. In an embodiment, the MR 110/410 is implemented with a first general-purpose processor and a first program memory; the AR 160/460 is implemented with a second general-purpose processor and a second program memory. The first program memory stores a first processor-executable program and the second program memory stores a second processor-executable program. When the first processor-executable program is executed by the first general-purpose processor, the first general-purpose processor is configured to function as: the MR 110/410. When the second processor-executable program is executed by the second general-purpose processor, the second general-purpose processor is configured to function as: the AR 160/460.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A texture prefetching apparatus in a graphics processing system having a texture memory, comprising:
    a first FIFO memory;
    a main rasterizer coupled to the first FIFO memory, comprising a first tag table and configured to perform a set of first operations comprising: (1) converting destination coordinates of a first pixel in a primitive into a cache entry and a tag for a first integer texel according to texture coordinates and destination coordinates of multiple vertices of the primitive, (2) looking up the tag in the first tag table according to the cache entry, (3) sending a hit flag and the cache entry to the first FIFO memory if a result of looking up the tag is a cache hit, and (4) updating the tag in the first tag table and sending a miss flag and the cache entry to the first FIFO memory if the result of looking up the tag is a cache miss;
    a second FIFO memory coupled to the texture memory;
    an auxiliary rasterizer coupled to the second FIFO memory, comprising a second tag table and configured to perform a set of second operations comprising: (a) converting destination coordinates of N second pixels in the primitive into multiple cache entries, multiple tags and multiple memory addresses for multiple second integer texels according to the texture coordinates and the destination coordinates of the multiple vertices of the primitive, (b) looking up the multiple tags in the second tag table according to the multiple cache entries, and (c) updating a corresponding tag in the second tag table and sending a corresponding memory address to the second FIFO memory if a result of looking up the multiple tags is a cache miss for anyone of the multiple cache entries, where N is a multiple of 4; and
    a cache data memory coupled to the first FIFO memory and the texture memory;
    wherein the first and the multiple second integer texels have integer texture coordinates; and
    wherein the main and the auxiliary rasterizers operate in parallel.

2. The apparatus according to claim 1, wherein the cache data memory comprises multiple cache lines, and tags in the first tag table and tags in the second tag table respectively correspond to the multiple cache lines.

3. The apparatus according to claim 2, wherein the first operation (1) comprises:
    (i) obtaining coefficients of a predefined equation according to the texture coordinates and the destination coordinates of the multiple vertices;
    (ii) obtaining texture coordinates of a first texel according to the destination coordinates of the first pixel and the predefined equation;
    (iii) obtaining integer texture coordinates of four integer texels surrounding the first texel; and
    (iv) calculating the cache entry and the tag for the first integer texel selected from the four integer texels according to the integer texture coordinates of the four integer texels and dimensions of the cache data memory and each cache line.

4. The apparatus according to claim 3, wherein the first operation (iv) comprises:
    calculating a unit position (c, d) as ($\lfloor u/Tw \rfloor$, $\lfloor v/Th \rfloor$) according to the integer texture coordinates (u, v) of the first integer texel;
    calculating the cache entry (s, t) as (c modulo Kw, d modulo Kh) for the first integer texel; and
    calculating the tag (a, b)=($\lfloor c/Kw \rfloor$, $\lfloor d/Kh \rfloor$) for the first integer texel, where the notation $\lfloor\ \rfloor$ denotes a floor function, wherein Tw and Th denote a width and a height of each cache line, and Kw and Kh denote a width and a height of the cache data memory.

5. The apparatus according to claim 2, wherein the second operation (a) comprises:
    (a1) obtaining coefficients of a predefined equation according to the texture coordinates and the destination coordinates of the multiple vertices;
    (a2) obtaining texture coordinates of N second texels according to the destination coordinates of the N second pixels and the predefined equation;
    (a3) obtaining integer texture coordinates of 4N integer texels surrounding the N second texels; and
    (a4) calculating the multiple cache entries, the multiple tags and the multiple memory addresses for the multiple second integer texels selected from the 4N integer texels according to a texture image width, a number of bytes per texel, the integer texture coordinates of the 4N integer texels, and dimensions of the cache data memory and each cache line.

6. The apparatus according to claim 5, wherein the second operation (a4) comprises:
    calculating a unit position (c, d) as ($\lfloor u/Tw \rfloor$, $\lfloor v/Th \rfloor$) according to the integer texture coordinates (u, v) of one of the multiple second integer texels;
    calculating the cache entry (s, t) as (c modulo Kw, d modulo Kh) for the one of the multiple second integer texels;
    calculating the tag (a, b) as ($\lfloor c/Kw \rfloor$, $\lfloor d/Kh \rfloor$) for the one of the multiple second integer texels; and
    calculating the memory address as (BA+(c×$\lceil Nx/w \rceil$+d)× K) for the one of the multiple second integer texels, wherein K=Tw×Th×m, the notation $\lceil\ \rceil$ denotes a ceiling function, the notation $\lfloor\ \rfloor$ denotes a floor function, Tw and Th denote a width and a height of each cache line, Kw and Kh denote a width and a height of the cache data memory, BA denotes a base address of the texture memory, Nx denotes the texture image width and m denotes the number of bytes per texel.

7. A texture prefetching method applied to a graphics processing system comprising a texture memory, a first FIFO memory, a second FIFO memory and a cache data memory, wherein the cache data memory is coupled between the first FIFO memory and the texture memory, wherein the second FIFO memory is coupled to the texture memory, the method comprising:

at a main rasterizer having a first tag table,
- (1) converting destination coordinates of a first pixel in a primitive into a cache entry and a tag for a first integer texel according to texture coordinates and destination coordinates of multiple vertices of the primitive;
- (2) looking up the tag in the first tag table according to the cache entry;
- (3) sending a hit flag and the cache entry to the first FIFO memory if a result of looking up the tag is a cache hit; and
- (4) updating the tag in the first tag table and sending a miss flag and the cache entry to the first FIFO memory if the result of looking up the tag is a cache miss;

at an auxiliary rasterizer having a second tag table,
- (a) converting destination coordinates of N second pixels in the primitive into multiple cache entries, multiple tags and multiple memory addresses for multiple second integer texels according to texture coordinates and destination coordinates of multiple vertices of the primitive;
- (b) looking up the multiple tags in the second tag table according to the multiple cache entries; and
- (c) updating a corresponding tag in the second tag table and sending a corresponding memory address to the second FIFO memory if a result of looking up the multiple tags is a cache miss for anyone of the multiple cache entries, where N is a multiple of 4;

wherein the first and the multiple second integer texels have integer texture coordinates; and wherein the steps (1) to (4) and the steps (a) to (c) are performed in parallel.

8. The method according to claim 7, wherein the cache data memory comprises multiple cache lines, and tags in the first tag table and tags in the second tag table respectively correspond to the multiple cache lines.

9. The method according to claim 8, wherein the step (1) comprises:

obtaining coefficients of a predefined equation according to the texture coordinates and the destination coordinates of the multiple vertices;

obtaining texture coordinates of a first texel according to the destination coordinates of the first pixel and the predefined equation;

obtaining integer texture coordinates of four integer texels surrounding the first texel; and calculating the cache entry and the tag for the first integer texel selected from the four integer texels according to the integer texture coordinates of the four integer texels and dimensions of the cache data memory and each cache line.

10. The method according to claim 9, wherein the step of calculating the cache entry and the tag comprises:

calculating a unit position (c, d) as ($\lfloor u/Tw \rfloor$, $\lfloor v/Th \rfloor$) according to the integer texture coordinates (u, v) of the first integer texel;

calculating the cache entry (s, t) as (c modulo Kw, d modulo Kh) for the first integer texel; and calculating the tag (a, b)=($\lfloor c/Kw \rfloor$, $\lfloor d/Kh \rfloor$) for the first integer texel, where the notation $\lfloor \ \rfloor$ denotes a floor function, wherein Tw and Th denote a width and a height of each cache line, and Kw and Kh denote a width and a height of the cache data memory.

11. The method according to claim 8, wherein the step (a) comprises:

obtaining coefficients of a predefined equation according to the texture coordinates and the destination coordinates of the multiple vertices;

obtaining texture coordinates of the N second texels according to the destination coordinates of the N second pixels and the predefined equation;

obtaining integer texture coordinates of 4N integer texels surrounding the N second texels; and calculating the multiple cache entries, the multiple tags and the multiple memory addresses for the multiple second integer texels selected from the 4N integer texels according to a texture image width, a number of bytes per texel, the integer texture coordinates of the 4N integer texels, and dimensions of the cache data memory and each cache line.

12. The method according to claim 11, wherein the step of calculating the multiple cache entries, the multiple tags and the multiple memory addresses comprises:

calculating a unit position (c, d) as ($\lfloor u/Tw \rfloor$, $\lfloor v/Th \rfloor$) according to the integer texture coordinates (u, v) of one of the multiple second integer texels;

calculating the cache entry (s, t) as (c modulo Kw, d modulo Kh) for the one of the multiple second integer texels;

calculating the tag (a, b)=($\lfloor c/Kw \rfloor$, $\lfloor d/Kh \rfloor$) for the one of the multiple second integer texels; and calculating the memory address as (BA+(c×$\lceil Nx/Tw \rceil$+d)×K) for the one of the multiple second integer texels, wherein K=Tw×Th×m, the notation $\lceil \ \rceil$ denotes a ceiling function, the notation $\lfloor \ \rfloor$ denotes a floor function, Tw and Th denote a width and a height of each cache line, Kw and Kh denote a width and a height of the cache data memory, BA denotes a base address of the texture memory, Nx denotes the texture image width and m denotes the number of bytes per texel.

13. A texture prefetching apparatus in a graphics processing system having a texture memory, comprising:

a pixel FIFO memory comprising a syn pixel FIFO memory;

a memory request device coupled to the texture memory and comprising a direct memory request FIFO memory and a sync memory request FIFO memory;

an auxiliary rasterizer coupled to the pixel FIFO memory and the memory request device, comprising a tag table and configured to perform a set of first operations comprising: (a) converting destination coordinates of a given pixel in a next primitive into a first cache entry, a tag and a memory address for a given integer texel having integer texture coordinates according to texture coordinates and destination coordinates of multiple vertices of the next primitive, (b) looking up the tag in the tag table according to the first cache entry, (c) sending the first cache entry to the sync pixel FIFO memory and the memory address to the sync memory request FIFO memory if a result of looking up is a cache miss and a corresponding cache line is occupied by texels of a current primitive, and (d) sending the first cache entry to the pixel FIFO memory and the memory address to the direct memory request FIFO memory if the result of looking up is a cache miss and the corresponding cache line is not occupied by the texels of the current primitive;

a cache data memory coupled to the pixel FIFO memory and the texture memory;

a main rasterizer coupled to the cache data memory and configured to perform a set of second operations comprising: (1) performing rendering processes for the current primitive, (2) sequentially updating the cache data memory with data from the texture memory according to second cache entries from the pixel FIFO memory, and (3) sequentially updating the cache data memory with data from the texture memory according to third cache entries from the sync pixel FIFO memory after the second operations (1) and (2) are completed, wherein the second operations (1) and (2) and the first operations (a) to (d) are performed in parallel.

14. The apparatus according to claim 13, wherein the cache data memory comprises multiple cache lines, and the multiple cache lines correspond to multiple tags in the tag table.

15. The apparatus according to claim 14, wherein the first operation (a) comprises:
 (a1) obtaining coefficients of a predefined equation according to the texture coordinates and the destination coordinates of the multiple vertices of the next primitive;
 (a2) obtaining texture coordinates of a texel according to the destination coordinates of the given pixel and the predefined equation;
 (a3) obtaining integer texture coordinates of four integer texels surrounding the texel; and
 (a4) calculating the first cache entry, the tag and the memory address for the given integer texel selected from the four integer texels according to a texture image width, a number of bytes per texel, the integer texture coordinates of the four integer texels, and dimensions of the cache data memory and each cache line.

16. The apparatus according to claim 15, wherein the first operation (a4) comprises:
 calculating a unit position (c, d) as ($\lfloor u/Tw \rfloor$, $\lfloor v/Th \rfloor$) according to the integer texture coordinates (u, v) of the given integer texel;
 calculating the first cache entry (s, t) as (c modulo Kw, d modulo Kh) for the given integer texel;
 calculating the tag (a, b) as ($\lfloor c/Kw \rfloor$, $\lfloor d/Kh \rfloor$) for the given integer texel; and
 calculating the memory address as (BA+(c×$\lceil Nx/Tw \rceil$+d)×K) for the given integer texel, wherein K=Tw×Th×m, the notation $\lceil \, \rceil$ denotes a ceiling function, the notation $\lfloor \, \rfloor$ denotes a floor function, Tw and Th denote a width and a height of each cache line, Kw and Kh denote a width and a height of the cache data memory, BA denotes a base address of the texture memory, Nx denotes the texture image width and m denotes the number of bytes per texel.

17. The apparatus according to claim 13, wherein the set of first operations further comprises:
 (e) sending a control signal with a first state to the memory request device;
 (f) repeating the first operations (a) to (e) until all the pixels in the next primitive are processed to send the control signal with a second state to the memory request device;
 wherein the memory request device further comprises a multiplier for outputting memory requests from the direct memory request FIFO memory according to the control signal with the first state and outputting memory requests from the sync memory request FIFO memory according to the control signal with the second state.

18. The apparatus according to claim 13, wherein the set of first operations further comprises:
 (g) repeating the first operations (a) to (d) until all the pixels in the next primitive are processed to send a first number Nd and a second number Ns to the cache data memory; and
 (h) moving the first cache entries in the sync pixel FIFO memory to the pixel FIFO memory;
 wherein the first number Nd denotes a number of sending the first cache entries to the pixel FIFO memory and the second number Ns denotes a number of sending the first cache entries to the sync pixel FIFO memory.

19. The apparatus according to claim 18, wherein the second operation (2) further comprises:
 sequentially updating the cache data memory with the data from the texture memory according to the first number Nd and the second cache entries from the pixel FIFO memory.

20. The apparatus according to claim 18, wherein the second operation (3) further comprises:
 sequentially updating the cache data memory with the data from the texture memory according to the second number Ns and the third cache entries from the sync pixel FIFO memory after the second operations (1) and (2) are completed.

21. A texture prefetching method applied to a graphics processing system comprising a texture memory, a pixel FIFO memory, a memory request device and a cache data memory, wherein the cache data memory is coupled between the pixel FIFO memory and the texture memory, wherein the memory request device is coupled to the texture memory and comprises a direct memory request FIFO memory and a sync memory request FIFO memory, wherein the pixel FIFO memory comprises a syn pixel FIFO memory, the method comprising:
 at an auxiliary rasterizer having a tag table,
  (a) converting destination coordinates of a given pixel in a next primitive into a first cache entry, a tag and a memory address for a given integer texel having integer texture coordinates according to texture coordinates and destination coordinates of multiple vertices of a next primitive;
  (b) looking up the tag in the tag table according to the first cache entry;
  (c) sending the first cache entry to the sync pixel FIFO memory and the memory address to the sync memory request FIFO memory if a result of looking up is a cache miss and a corresponding cache line is occupied by texels of a current primitive; and
  (d) sending the first cache entry to the pixel FIFO memory and the memory address to the direct memory request FIFO memory if the result of looking up is a cache miss and the corresponding cache line is not occupied by the texels of the current primitive;
 at a main rasterizer,
  (1) performing rendering processes for the current primitive;
  (2) sequentially updating the cache data memory with data from the texture memory according to second cache entries from the pixel FIFO memory; and
  (3) sequentially updating the cache data memory with data from the texture memory according to third cache entries from the sync pixel FIFO memory after the steps (1) and (2) are completed;
wherein the steps (1), (2) and (a) to (d) are performed in parallel.

22. The method according to claim 21, wherein the cache data memory comprises multiple cache lines, and the multiple cache lines correspond to a number of tags in the tag table.

23. The method according to claim 22, wherein the step (a) comprises:
obtaining coefficients of a predefined equation according to the texture coordinates and the destination coordinates of the multiple vertices of the next primitive;
obtaining texture coordinates of a texel according to the destination coordinates of the given pixel and the predefined equation;
obtaining integer texture coordinates of four integer texels surrounding the texel; and
calculating the first cache entry, the tag and the memory address for the given integer texel selected from the four integer texels according to a texture image width, a number of bytes per texel, the integer texture coordinates of the four integer texels, dimensions of the cache data memory and each cache line.

24. The method according to claim 23, wherein the step of calculating comprises:
calculating a unit position (c, d) as ($\lfloor u/Tw \rfloor$, $\lfloor v/Th \rfloor$) according to the integer texture coordinates (u, v) of the given integer texel;
calculating the first cache entry (s, t) as (c modulo Kw, d modulo Kh) for the given integer texel;
calculating the tag (a, b) as ($\lfloor c/Kw \rfloor$, $\lfloor d/Kh \rfloor$) for the given integer texel; and
calculating the memory address as (BA+(c×$\lceil Nx/Tw \rceil$+d)× K) for the given integer texels, wherein K=Tw×Th×m, the notation $\lceil \, \rceil$ denotes a ceiling function, the notation $\lfloor \, \rfloor$ denotes a floor function, Tw and Th denote a width and a height of each cache line, Kw and Kh denote a width and a height of the cache data memory, BA denotes a base address of the texture memory, Nx denotes the texture image width and m denotes the number of bytes per texel.

25. The method according to claim 21, further comprising:
at the auxiliary rasterizer,
(e) sending a control signal with a first state to the memory request device; and
(f) repeating the steps (a) to (e) until all the pixels in the next primitive are processed to send the control signal with a second state to the memory request device;
at the memory request device,
outputting memory requests from the direct memory request FIFO memory according to the control signal with the first state; and
outputting memory requests from the sync memory request FIFO memory according to the control signal with the second state.

26. The method according to claim 21, further comprising:
at the auxiliary rasterizer,
repeating the steps (a) to (d) until all the pixels in the next primitive are processed to send a first number Nd and a second number Ns to the cache data memory; and
moving the first cache entries in the sync pixel FIFO memory to the pixel FIFO memory;
wherein the first number Nd denotes a number of sending the first cache entries to the pixel FIFO memory and the second number Ns denotes a number of sending the first cache entries to the sync pixel FIFO memory.

27. The method according to claim 26, wherein the step (2) further comprises:
sequentially updating the cache data memory with the data from the texture memory according to the first number Nd and the second cache entries from the first FIFO memory.

28. The method according to claim 26, wherein the step (3) further comprises:
sequentially updating the cache data memory with the data from the texture memory according to the second number Ns and the third cache entries from the sync pixel FIFO memory after the steps (1) and (2).

* * * * *